United States Patent [19]  [11] 3,932,313
Reynolds et al. [45] Jan. 13, 1976

[54] PROCESS FOR MANUFACTURE OF POSITIVE TEMPERATURE COEFFICIENT MATERIALS

[75] Inventors: Thomas G. Reynolds, Woodstock, N.Y.; Oscar A. Nietzel, Dedham, Mass.

[73] Assignee: Texas Instruments Incorporated, Dallas, Tex.

[22] Filed: Dec. 28, 1973

[21] Appl. No.: 429,441

[52] U.S. Cl. ............ 252/520; 106/73.3; 106/73.31; 252/518; 252/521
[51] Int. Cl.² ........................................ H01B 1/08
[58] Field of Search .................. 252/520, 518, 521

[56] References Cited
UNITED STATES PATENTS
3,637,531  1/1972  Faxon et al. ........................ 252/520

Primary Examiner—Benjamin R. Padgett
Assistant Examiner—E. Suzanne Parr
Attorney, Agent, or Firm—James P. McAndrews; John A. Haug; Russell E. Baumann

[57] ABSTRACT

A process for preparation of a positive temperature coefficient material of the barium titanate/barium zirconate type. An aqueous feed mixture comprising a compound of barium or other suitable divalent cation and an organic compound of titanium or zirconium is introduced into an anterior zone adjacent a heated reaction zone in a rotating, inclined, tubular furnace or other useful calcining equipment. At the entrance of the reaction zone, the feed mixture forms a mass which swells in response to heat emanating from the tube wall and the reaction zone, undergoes dehydration and ignites. Particles break away from the mass and enter the reaction zone where they are calcined in an oxidizing atmosphere to produce the product material. Both these particles and the product material are milled as they pass through the reaction zone. Product material discharging from the reaction zone is collected for use in the manufacture of positive temperature coefficient elements.

14 Claims, 2 Drawing Figures

PROCESS FOR MANUFACTURE OF POSITIVE TEMPERATURE COEFFICIENT MATERIALS

BACKGROUND OF THE INVENTION

This invention relates to the field of high temperature ceramic reactions and more particularly to an improved process for preparing barium titanate and related semiconductive materials by a continuous calcining process.

Barium titanate and perovskite — related titanates and zirconates, when properly doped, are semiconductive materials which undergo solid phase changes at particular temperatures. Associated with these phase changes are very abrupt and large changes in the resistivity of the materials. The temperature at which such abrupt change occurs is referred to as the curie point and, because the change is positive with respect to temperture, the aforesaid titanates and zirconates are referred to as "positive temperature coefficient" materials. As a result of the resistance in temperature anomaly which they exhibit, these materials have been found useful as thermosensing elements in numerous diverse applications.

Among the various divalent cations which may be partially or totally substituted for barium in positive temperature coefficient titanate and zirconate compounds are calcium, strontium, lead, and tin. The partial or total substitution of the latter cations provides a semiconductive material whose curie point is in some cases higher and in other cases lower than pure barium titanate. The usefulness of these materials arises from the inclusion of minor proportions of various dopants such as lanthanide series rare earth metals, antimony and bismuth. The oxides of these metals are also useful as dopants. Other dopants or promoters such as iron, cobalt, manganese, ruthenium, vanadium, chromium, aluminum or silicon or te oxides thereof are also useful in very minor amounts for the purpose of increasing the extent of change in resistance at the curie point and sharpening the transition by increasing the slope of the resistivity vs. temperature curve in the neighborhood of the curie point.

The preparation of barium titanate and related positive temperature coefficient materials involves high temperature ceramic reactions which require careful proportioning of reactants and intimate intermixture thereof to assure complete reaction and stoichiometric balance in the product, factors which are important to a sharp and definitive response at the curie point. Because the reactants from which barium titanate is produced are solid at the reaction temperature, both the solid state diffusion-controlled reaction and the problem of separating unreacted material from the product render the realization of optimum properties difficult to achieve. In conventional solid state ceramic reaction processes, the raw materials tend to be inadequately mixed and additional contaminants are frequently introduced during mechanical mixing. Also, undesirable crystalline transformations such as anatase to rutile transformation of titanium dioxide may occur during the process, and the product of the process often fails to possess the desired physical and electrical properties.

Attempts have been made in the art to develop wet chemical processes for the production of barium titanate and related materials. One process which has previously been employed for the production of barium titanate is that described by Walsh in U.S. Pat. No. 2,988,422. In accordance with that process, a finely dispersed solution of titanium lactate and a barium compound is passed through a flame for volatilization of the solvent and thermal decomposition of the barium and titanium compounds to crystalline barium titanate. The product of this process is thus formed as a fine gas-borne dust and process equipment must consequently be adapted for handling substantial volumetric flow rates relative to the rate of production. The fine dust product also presents obvious collection problems and, in the case of toxic products such as lead titanate, the operation of this type of process may involve health hazards. Because of its exceptionally small particle size, moreover, the product of a direct flame reaction process may also be susceptible to discontinuous grain growth, with resultant formation of large individual grains in the fine grain material.

Another process known to the art for the production of barium titanate and related semiconductive materials is that described by Faxon et al. in U.S. Pat. No. 3,637,531. In accordance with the method of Faxon et al., one reactant solution is prepared containing the titanium chelate of triethanolamine, a second solution is prepared containing an alkaline earth salt such as barium acetate, the two solutions are combined to provide a common solution, and the common solution is heated at a low temperature to form a gel in which intimate intermixture of the alkaline earth salt and titanium compound are achieved. The gel is then heated at high temperature in an oxidizing or neutral atmosphere for the purpose of calcining the constituents of the gel and forming the desired titanate product. The method of Faxon et al. is a substantial improvement in the art, but this process involves heating with the process materials in a static state. If carried out continuously, the Faxon et al. process suggests that the feed materials be carried through the reaction zone in boats or other ceramic vessels which hold discrete quantities of static material. There has, thus, remained a need in the art for further improved methods of preparing barium titanate and those related titanates and zirconates which possess the advantageous electrical properties described above.

SUMMARY OF THE INVENTION

Among the several objects of the present invention, therefore, may be noted the provision of an improved process for the preparation of the titanates and zirconates of barium, calcium, strontium, lead, and tin; the provision of such processes in which product collection is simply and directly carried out; the provision of such processes which may be carried out continuously without the necessity of employing boats or other ceramic vessels for carrying the reactants in a static state; the provision of such processes in which the semiconductive product may be continuously produced in bulk without significant risk of contaminating the surroundings with toxic compounds such as a lead compound; the provision of such processes in which precursor materials are rapidly and directly converted to the semiconductive product within a matter of minutes; and the provision of such processes in which a uniform particle size, high quality product may be consistently produced. Other objects and features will be in part apparent and in part pointed out hereinafter.

The present invention is thus directed to a process for preparing a positive temperature coefficient material selected from the group consisting of the titanates and zirconates of divalent cations selected from the group consisting of barium, calcium, strontium, lead and tin. A feed mixture is prepared comprising water, a compound of the divalent cation and an anion precursor compound selected from the group consisting of organic titanium compounds and organic zirconium compounds. This mixture is introduced into an anterior zone adjacent a reaction zone and heated to form at the entrance of the reaction zone a mass which swells, dehydrates, and ignites. Particles are broken away from the mass to enter the reaction zone and these particles pass through the reaction zone where they are calcined at red heat in an oxidizing atmosphere to produce the aforesaid material. The particles and the product material are milled in the reaction zone. The product material is discharged from the reaction zone.

DESCRIPTION OF THE PREFERRED EMBODIMENTS

Figure 1:
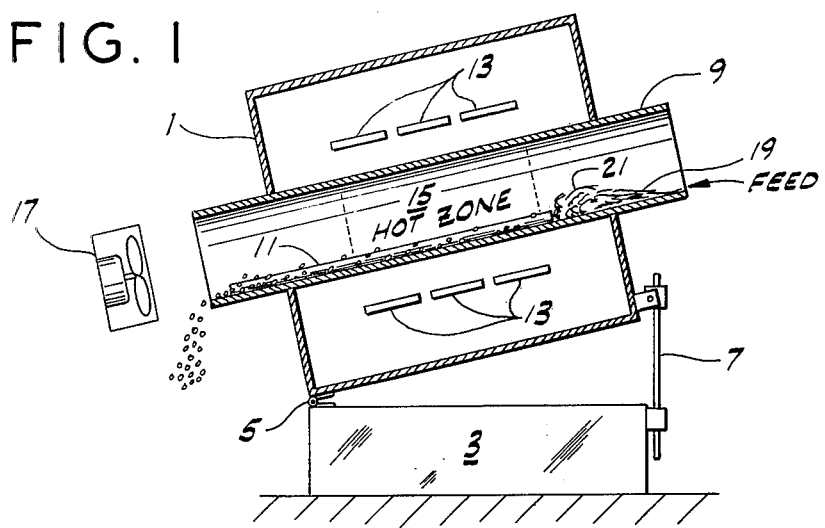
FIG. 1 is a schematic drawing showing the operation of a tubular furnace in which the process of the invention is advantageously conducted.

It has now been discovered that rapid continuous production of barium titanate and related semiconductive titanates and zirconates of certain divalent metals can be rapidly and continuously carried out in bulk using equipment such as a rotating inclined tubular furnace. A chemically homogeneous feed solution or microscopically homogeneous slurry containing appropriate precursor compounds is charged to the upper end of the furnace, and a high quality particulate product is continuously discharged from the lower end thereof. Product material collection is thus simple and straightforward and no need is presented for the handling of large gas volumes from which a fine dusty product must be separated. Because of the low gas volumes to be handled and the relatively compact size of equipment required for a particular throughput, control of the process to prevent escape of toxic compounds to the atmosphere is greatly facilitated.

All of the process materials are handled in bulk in the process of the invention, and no need exists for boats or other ceramic vessels for carrying static mixtures through a reaction zone. The necessity of two separate and distinct sequential batch heating cycles at low and high temperatures, respectively, is also avoided.

The titanate and zirconate positive temperature coefficient materials prepared by the process of the invention generally correspond to the formula:

$Ba_zM1_{x_1}, \ldots M_{n_{x_n}} D_yO_3:a_lA_l, \ldots a_nA_n; b_lB_l, \ldots b_nB_n$ In this formula $M_1$ to $M_n$ (generally $M_i$) represent divalent cations selected from the group consisting of calcium, strontium, lead, tin, cobalt and nickel, D is selected from the group consisting of titanium and zirconium or mixtures thereof, and $$0 \leq \sum_{i=1}^{n} x_i \leq 1; z = 1 - \sum_{i=1}^{n} x_i$$

$0.90 \leq y \leq 1.10$ $A_l$ to $A_n$ (generally $A_i$) are dopants which may typically be one of the lanthanide series rare earths, i.e., those elements having atomic numbers between 57 and 71, inclusive. Alternatively, any one of $A_l$ to $A_n$ may be a lanthanide rare earth oxide, antimony, antimony oxide, bismuth, or bismuth oxide. As indicated above, the presence of a dopant of the $A_i$ type renders the titanate or zirconate compound more semiconductive and less insulating. The presence of such a dopant is optional, and the sum of the proportions of all dopants of the type $A_i$ type should not exceed approximately 1 molar percent of the semiconductive titanate or zirconate. Thus, $$0 \leq \sum_{i=1}^{n} a_i \leq 0.01$$

$B_l$ to $B_n$ ($B_i$ type) are different types of dopants (hereinafter referred to as promoters) which, as noted above, increase the extent and slope of the resistance anamoly at the curie point. $B_l$ to $B_n$ may be iron, cobalt, manganese, ruthenium, vanadium, chromium, aluminum, silicon or an oxide of these elements. Very small proportions of $B_i$ type promoters provide the desired result and, in the case of iron, adverse effects are experienced if more than very minor amounts are present. Generally, therefore, $$0 \leq \sum_{i=1}^{n} b_i \leq 0.003$$

The feed mixture charged to the process of the invention is an aqueous mixture, preferably a solution containing an anionic precursor compound of D and a reactable compound of barium, or of a type $M_i$ divalent cation. The concentrations of these compounds in the feed mixture are proportioned to provide substantial stoichiometric equivalence between D and the sum of barium and $M_l$ to $M_n$ within the ranges noted above. As sources of type $A_i$ dopants and/or type $B_i$ promoters, reactable compounds of lanthanide rare earths, antimony, bismuth, iron, cobalt, manganese, ruthenium, vanadium, chromium, aluminum or silicon may also be included in the feed mixture in proportions consonant with the limitations on the $A_l$ to $A_n$ and $B_l$ to $B_n$ contents of the product.

Uniformity of the product is promoted if the feed mixture is a true solution rather than a slurry since chemical homogeneity of feed is most perfectly realized in a solution. For maximum productivity, however, the feed solution may be substantially saturated with respect to the reactant which is least soluble. Maximum concentration reduces the vaporization heat load of the process and increases productivity. At the high concentrations thus desirable, the D compound, though not necessarily limiting from the standpoint of saturation, may be subject to hydrolysis to form insoluble precipitates. To forestall this eventuality, the feed solution preferably includes an acid, such as acetic or a lactic acid, to lower the pH and inhibit the formation of such precipitates.

Compounds of barium and $M_i$ divalent cations which are suitable for inclusion in the feed mixture are those which are pyrolyzable in an oxidizing atmosphere to yield barium oxide and/or oxide of $M_i$. It is highly preferable, of course, that these salts be watersoluble also. The barium salts of lower molecular weight carboxylic acids, for example, barium formate, barium acetate and barium propionate, are particularly suitable. Also generally useful are the corresponding carboxylates of calcium, strontium, lead, tin, cobalt and nickel. Pyrolyzable inorganic salts of barium and $M_i$, such as barium nitrate, lead nitrate, etc., may also be usefully included in the feed mixture.

It is strongly preferred that the anion precursor compound of D included in the feed mixture be an oxidized species to minimize the extent of combustion required to produce the titanate or zirconate in the reaction zone. Carboxylates, such as titanium lactate and titanium acetate, are especially suitable.

Where a source of a dopant or promoter is included in the feed mixture, the same general considerations apply to its selection as are discussed above with respect to compounds of barium and compounds of $M_i$ to $M_n$.

The process of the invention is preferably carried out in a tubular furnace of the type depicted in FIG. 1. This furnace includes a support chamber and heating mantel 1 carried by a base 3 on a hinge 5 at one end and a vertically adjustable support 7 at the other. A ceramic tube 9 is rotatably supported within chamber 1 and contains longitudinally extending rods 11. Silicon carbide heating elements 13 are of sufficient capacity to maintain red heat (>800°C.) in a zone 15 (hereinafter the hot zone) spaced inwardly of the upper end of the tube, during passage of process materials therethrough. A blower 17 provides a forced draft of air through the furnace to serve as an oxygen supply.

In the practice of the process of the invention, support 7 is adjusted so that tube 9 is inclined and the tube is rotated within chamber 1. Liquid feed mixture is continuously introduced into the upper end of tube 9 and flows along the bottom wall of the tube, forming a liquid puddle thereon in the anterior zone 19 upstream of hot zone 15. As the liquid puddle approaches hot zone 15, it begins to foam and swell due to absorption of heat emanating from the tube wall and hot zone 15, and forms a foaming mass at the entrance of the hot zone, as shown at 21 in FIG. 1. As the feed mixture flows downstream through mass 21, it becomes progressively dehydrated and ultimately ignites. The agitation effected by foaming and swelling of the feed maintains the homogeneity of the feed as it dehydrates, thus providing an exceptionally intimate mixture entering the reaction zone. Particles of this intimately intermixed dehydrated feed material break away from the downward end of the mass and pass into hot zone 15 where the calcining reaction takes place to form the product material. Breakage of particles from the front end of mass 21 is assisted by the action of the upper ends of rods 11 which are tumbling within tube 9. In effect, these rods "chew" away particles from the downward end of mass 21. The solid particles and product material move downwardly along the furnace tube by gravity flow, assisted by the rotation of the tube.

As the dehydrated particles pass through the reaction zone and are transformed to the product material by decomposition, oxidation and chemical combination of the feed constituents, both the unreacted or partially reacted particles and the product material are milled by rods 11, thus assuring a fine uniform particle size for the product. The fully reacted milled product material is continusouly discharged and collected at the lower end of tube 9.

The temperature in the reaction zone may be varied rather widely but a temperature of 1000°–1200°C. is usually preferred. Higher temperatures can be used but are generally unnecessary. Excessively high temperatures are undesirable where the process materials contain lead or other toxic volatile metals. Where a high proportion of lead is present, lower temperatures in the 800°–1000°C. range may be preferred.

The rate of feed is adjusted so that the residence time within the furnace is in the range of approximately 2–10 minutes. Somewhat longer residence may be required where the hot zone temperature is significantly less than 1000°C. To avoid too rapid passage through the furnace of individual droplets of feed material, the feed shold not be delivered as an atomized mist but should preferably flow as a stream onto the bottom wall of tube 9. In this way, mass 21 may restrain excessively rapid passage of individual droplets through the furnace and thus avoid the presence of significant proportions of unreacted material in the product. If desired, the feed mixture can be delivered to tube 9 as a coarse spray but should, in any event, enter the tube below its longitudinal centerline so as to avoid bypassing mass 21.

In order to optimize the size of and residence time in mass 21, the mass itself should be restrained from entering entirely into the heated reaction zone and preferably should be positioned in a zone where the temperature is between about 400°C. and about 700°C. Rods 11 serve the further function of acting as a barrier to excessive downstream movement of mass 21.

The angle of inclination of tube 9 and its rate of rotation are not critical per se, but do affect the residence time in the heated reaction zone and thus must be adjusted to insure that the particles of dehydrated reactant breaking away from mass 21 are exposed to a temperature of greater than or equal to the calcining temperature for a time sufficient for complete conversion. Satisfactory results are generally obtained using a rotational velocity of 3–15 rpm and a furnace inclination of 1°–10°. Incomplete reaction is indicated by the passage of carbon out the lower end of the furnace and observation of carbon in the product may call for increasing the residence time by reducing the angle of inclination and/or the rotational velocity. Since the temperature and rate of air passage through the furnace also affect the reaction rates in the heated reaction zone, adjustments in these parameters may also be appropriate when carbon is observed in the product material.

The product of the process of the invention is a uniform fine particle size material having a perovskite-related crystalline structure. In contrast to the products of conventional ceramic processes, the product of the instant process is highly friable and readily processed further into semiconductive elements useful as temperature sensors, etc. Because of the uniformity and purity achieved in the process of the invention, the semiconductive elements obtained by compacting the product of this process have highly predictable and uniform electrical properties.

Preparation of the compacted elements is accomplished by conventional means using conventional binding materials, such as polyvinyl alcohol, polyethylene glycol and various paraffins. Dopant and promoter sources may also be included in the formulation used for preparing compacted elements. As noted above, however, dopant and promoter precursors may advantageously be incorporated in the mixture fed to the process of the invention.

Although the process is described hereinabove only by reference to a rotatable inclined furnace, it will be understood that other equipment which moves the process material continuously through a reaction zone could also be utilized. Thus, for example, the process could be carried out in a nonrotating furnace having one or more internal screws for transporting and milling particles breaking away from the foaming mass of dehydrating feed material.

The following examples illustrate the invention:

EXAMPLE 1

A feed solution was prepared having the following composition:

| Constituent | % By Weight |
|---|---|
| aqueous solution of titanium lactate (14% $TiO_2$) | 36.8 |
| lanthanum acetate | 0.06 |
| barium acetate | 13.7 |
| strontium acetate | 1.8 |
| acetic acid | 3.9 |
| water | 43.7 |

This feed solution was calcined in an electrically heated, rotated and inclined tubular furnace constructed of alumina and having a length of 1200 mm and an internal diameter of 75 mm. The furnace was supported at both ends and chain driven at its lower end. It was heated by means of silicon carbide resistance elements and had a uniform hot zone 450 mm in length. The tilting mechanism on the furnace was capable of raising its upper end approximately 300 mm (approximately a 10° tilt) and the rotational drive system was controllable at rotational speeds in the range of 3 to 15 rpm. The furnace contained two rods approximately 25 mm in diameter and approximately 850 mm long extending downwardly through the furnace tube from a point near the upper end of the hot zone.

With the furnace maintained at a 6° tilt and rotated at 7 rpm, the feed solution was introduced into the furnace at a rate sufficient to produce 8 to 10 grams per minute of product by directing a stream of the feed solution along the bottom wall at the upper end of the furnace. The hot zone of the furnace was maintained at a temperature of 1150°C. and the feed solution, which formed a puddle on the bottom wall of the furnace in the anterior zone upstream of the hot zone, swelled into a foaming mass and ignited at the entrance of the hot zone in response to heat emanating therefrom. Particles breaking away from the downstream end of this mass passed through the hot zone where they underwent reaction and were milled by the rods to produce a friable product having the approximate formula:

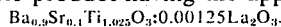
$Ba_{0.9}Sr_{0.1}Ti_{1.025}O_3:0.00125La_2O_3$.

EXAMPLE 2

A feed solution was prepared having the following composition:

| Constituent | Grams |
|---|---|
| aqueous titanium lactate solution (13.1% $TiO_2$) | 4645 |
| barium acetate | 1893 |
| lead nitrate | 30 |
| bismuth acetate | 10 |
| lactic acid | 714 |
| acetic acid | 350 |
| water | 4156 |

This feed solution was introduced as a solid stream onto the bottom wall of the upper end of the furnace described in Example 1 at a rate sufficient to produce 7 grams per minute of product while the furnace was rotated at 7 rpm and maintained at a 3.5° tilt from the horizontal. The hot zone was maintained at 1120°C. As in Example 1, the feed solution formed a foaming mass and ignited at the entrance of the hot zone. Particles broke away from the downstream end of this mass and were reacted and milled to form a cream-colored friable product having the approximate formula:

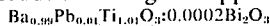
$Ba_{0.99}Pb_{0.01}Ti_{1.01}O_3:0.0002Bi_2O_3$

EXAMPLE 3

The feed solution of Example 2 was calcined in the manner described in Example 2 except that the furnace was rotated at 10 rpm and the hot zone was maintained at 910°C. Under these conditions, unreacted carbon appeared in the product until the production rate was lowered to approximately 5.3 grams per minute.

EXAMPLE 4

A feed solution was prepared having the following composition:

| Constituent | Grams |
|---|---|
| aqueous solution of titanium lactate (13.1% $TiO_2$) | 4645 |
| barium acetate | 1724 |
| lead nitrate | 248 |
| bismuth lactate | 10 |
| lactic acid | 715 |
| water | 4747 |

This feed solution was introduced as a solid stream onto the bottom wall of the upper end of the furnace described in Example 1 at a rate sufficient to produce about 6.5 grams per minute of product while the furnace was rotated at 10 rpm and maintained at a 3.5° tilt from horizontal. The hot zone was maintained at 1000°C. As in Example 1, the feed solution formed a foaming mass and ignited at the entrance of the hot zone. Particles broke away from the downstream end of this mass and were reacted and milled to form a white to whitishblue friable product having the approximate formula:

$Ba_{0.90}Pb_{0.10}Ti_{1.01}O_3:0.002Bi_2O_3$

EXAMPLE 5

A feed solution was prepared having the following composition:

| Constituent | Grams |
|---|---|
| aqueous solution of titanium lactate (13.1% TiO$_2$) | 4645 |
| barium acetate | 1724 |
| lead nitrate | 248 |
| bismuth lactate | 10 |
| lactic acid | 715 |
| iron nitrate | 0.3 |
| water | 4747 |

This feed solution was introduced as a solid stream onto the bottom wall of the upper end of the furnace described in Example 1 at a rate sufficient to produce 6.2 to 7.1 grams per minute of product while the furnace was rotated at 10 rpm and maintained at a 3.5° tilt from the horixontal. The hot zone was maintained at 1000°C. As in Example 1, the feed solution formed a foaming mass which ignited and from which particles broke away and were milled to produce a soft, friable white powder with a blue hue. The product had the approximate formula:

$Ba_{0.90}Pb_{0.10}Ti_{1.01}O_3{:}0.002BiO_3{,}0.0001Fe_2O_3$

EXAMPLE 6

The feed solution of Example 5 was calcined in the manner described in Example 5 except that the temperature in the hot zone was 1150°C. and the production rate was 8 grams per minute. A sustained run was made under these conditions and required only minor operator attention. The product was similar in character and composition to the product of Example 5.

EXAMPLE 7

A feed solution was prepared having the following composition:

| Constituent | % By Weight |
|---|---|
| aqueous solution of titanium lactate (15% TiO$_2$) | 33.9 |
| lanthanum acetate | 0.06 |
| barium acetate | 16.0 |
| water | 47.0 |
| acetic acid | 30 |

This feed solution was introduced into the furnace described in Example 1 at the rate sufficient to produce 9 to 11 grams per minute of product. The feed was impinged as a solid stream on the sidewall of the furnace at a point spaced approximately 160 mm inward of the tube end while the furnace was rotated at 10 rpm and maintained at a 3.5° tilt from the horizontal. The hot zone was maintained at 1150°C. As in Example 1, the feed solution which particles broke away and were reacted and milled to form a friable product having the approximate formula: $BaTi_{1.025}O_3{:}0.00125La_2O_3$

EXAMPLE 8

A feed solution was prepared having the following composition:

| Constituent | Grams |
|---|---|
| aqueous titanium lactate solution (14% TiO$_2$) | 1237.9 |
| barium acetate | 459.8 |
| lead nitrate | 66.2 |
| lactic acid | 190.8 |
| water | 1183 |

This feed solution was sprayed at a rate of about 40 cc/min onto the interior walls of a furnace of the type described in Example 1 while the furnace was rotated at 6 rpm and maintained at a 1° tilt from the horizontal. The hot zone was maintained at about 1050°C. The product was a friable ceramic powder having the approximate formula: $Ba_{0.9}Pb_{0.1}Ti_{1.015}O_3$. X-ray examination of the product showed lines characteristic only of a perovskite structure.

This ceramic product material was subsequently crushed and bismuth nitrate sufficient to provide a doping level of 0.35 atomic percent was added thereto along with a polyvinyl acetate binder sold under the trade designation "Plyamul" by Reichold Chemicals, Inc. The resultant mixture was pressed into three elements having shapes suitable for use as positive temperature coefficient elements. The binder was burned off at 1000°C. for 1 hour and the elements, stacked two high and covered with alumina boats, were fired at 1350°C. in a Sentry 9VL furnace. After firing was complete, the resistance of each of the three elements was measured at a series of temperatures between 25°C. and 270°C. The results of these measurements are set forth in the table below.

Resistance vs. Temperature

| Temperature °C. | Element No. 1 log R ($\Omega$) | Element No. 2 log R ($\Omega$) | Element No. 3 log R ($\Omega$) |
|---|---|---|---|
| 25 | 21.6 | 19.9 | 19.7 |
| 100 | 15.2 | 14.1 | 14.0 |
| 125 | 14.0 | 13.0 | 12.8 |
| 150 | 15.2 | 13.7 | 13.4 |
| 160 | 18.0 | 15.4 | 14.6 |
| 170 | 33.6 | 25.0 | 20.9 |
| 175 | 61.4 | 41.9 | 37.0 |
| 180 | 130.6 | 83.0 | 69.0 |
| 185 | 770.4 | 515.0 | 596.0 |
| 190 | 1.94K | 1.38K | 1.67K |
| 200 | 7.13K | 5.61K | 6.66K |
| 210 | 17.18K | 14.49K | 16.78K |
| 220 | 29.73K | 26.42K | 29.50K |
| 230 | 39.6K | 37.7K | 39.9K |
| 240 | 45.11K | 43.7K | 46.3K |
| 250 | 47.3K | 47.4K | 49.3K |
| 260 | 47.1K | 48.9K | 49.7K |
| 270 | 45.1K | 48.3K | 48.3K |

Figure 2:
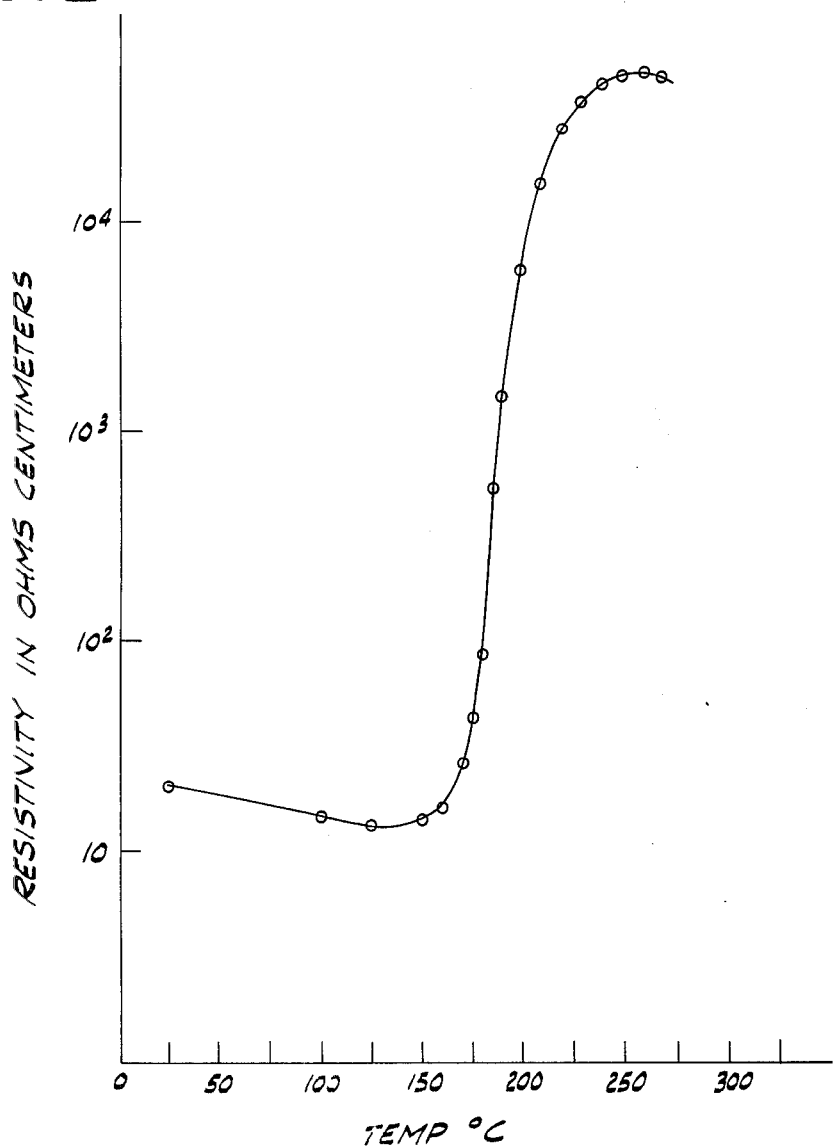
FIG. 2 is a graph illustrating the relationship between resistivity and temperature of a barium titanate product produced in accordance with the process of the invention.

A plot of resistance vs. temperature for element No. 2 is set forth in FIG. 2 of the drawings.

In view of the above, it will be seen that the several objects of the invention are achieved and other advantageous results attained.

As various changes could be made in the above methods without departing from the scope of the invention, it is intended that all matter contained in the above description or shown in the accompanying drawing shall be interpreted as illustrative and not in a limiting sense.

What is claimed is:

1. A process for preparing a positive temperature coefficient material selected from the group consisting of the titanates and zirconates of divalent cations selected from the group consisting of barium, calcium, strontium, lead, and tin comprising the steps of:

preparing a feed mixture comprising water, a compound of said divalent cation pyrolyzable in an oxidizing atmosphere to yield an oxide of said divalent cation, and an anion precursor compound selected from the group consisting of organic titanium lactate and acetate compounds and organic zirconium lactate and acetate compounds or mixtures thereof;

introducing said feed mixture into an anterior zone adjacent a reaction zone;

advancing said feed mixture from said anterior zone into said reaction zone;

heating said advancing feed material at the entrance to said reaction zone to a temperature sufficient to form at the entrance of said reaction zone a mass which swells, dehydrates and ignites;

breaking particles away from said mass at the entrance to said reaction zone to enter the reaction zone;

passing said particles through said reaction zone at a selected rate while heating said particles in an oxidizing atmosphere in the reaction zone at a temperature of at least about 800°C. sufficient to calcine said particles as rhe particles are passed through the reaction zone thereby to produce said positive temperature coefficient material;

milling said particles and said material in said reaction zone; and discharging the product material from the reaction zone.

2. A process as set forth in claim 1 wherein said feed mixture also includes up to approximately 1 molar percent based on the weight of semiconducting titanate or zirconate of a source of a dopant selected from the group consisting of oxides of lanthanide series rare earths, antimony, antimony oxide, bismuth, bismuth oxide and mixtures thereof.

3. A process as set forth in claim 1 wherein said feed mixture further comprises a source of a promoter selected from the group consisting of oxides of iron, cobalt, manganese, ruthenium, vanadium, chromium, aluminum, silicon and mixtures thereof.

4. A process as set forth in claim 1 wherein said particles are calcined by heating them at a temperature of at least about 1000°C.

5. A process as set forth in claim 4 wherein the residence time of said particles and said material in said reaction zone is between about 2 and about 10 minutes.

6. A process as set forth in claim 1 wherein said feed mixture is continuously introduced into said anterior zone and said material in continuously discharged from said reaction zone.

7. A process as set forth in claim 6 wherein said feed mixture is introduced into the upper end of a rotating inclined tubular furnace having a red heat zone constituting said reaction zone extending downwardly along the incline from a point spaced inwardly from the upper end of the furnace tube, said feed mixture flows through the space in said tube constituting said anterior zone upstream of said reaction zone and forms a mass on the bottom wall of said tube at the entrance of said reaction zone, and said particles are broken away from said mass at its downstream end and passed by gravity flow through said reaction zone wherein they are converted to said product material.

8. A process as set forth in claim 7 wherein said feed mixture is advanced by gravity feed from said anterior zone into said reaction zone and at least part of said mass is engaged by barrier-forming means for positively restraining the mass from passing entirely into said reaction zone as a mass unit.

9. A process as set forth in claim 8 wherein said feed mixture is heated to form said mass by heating said feed mixture in a zone at the entrance to the reaction zone where the temperature is between about 400°C. and about 700°C.

10. A process as set forth in claim 8 wherein said tubular furnace contains rods for milling said particles and said product, said rods extending downwardly along said incline from said mass and serving as a barrier for restraining said mass from passing entirely into said reaction zone.

11. A process as set forth in claim 7 wherein said feed is introduced into the upper end of said tube below the longitudinal center line thereof.

12. A process as set forth in claim 7 wherein a gas containing oxygen is blown through said tube to promote the conversion of said particles to said product material.

13. A process as set forth in claim 1 wherein said anion precursor compound is an organic compound of titanium lactate or acetate.

14. A process as set forth in claim 13 wherein said feed mixture contains a titanium carboxylate selected from the group consisting of titanium lactate and titanium acetate, a pyrolyzable compound of barium selected from the group consisting of barium formate, barium acetate and barium propionate, and a carboxylic acid selected from the group consisting of lactic and acetic acid.

* * * * *